US006772175B2

(12) United States Patent
MacPherson

(10) Patent No.: US 6,772,175 B2
(45) Date of Patent: Aug. 3, 2004

(54) DATABASE THAT STORES DATA FOR A THREE-DIMENSIONAL MESH

(75) Inventor: Michael B. MacPherson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 09/872,278

(22) Filed: May 31, 2001

(65) Prior Publication Data

US 2002/0184245 A1 Dec. 5, 2002

(51) Int. Cl.$^7$ .................................................. G06F 7/00

(52) U.S. Cl. .................................... 707/104.1; 707/102

(58) Field of Search .............................. 345/418, 419, 345/420, 421, 423, 475; 712/10; 382/154; 707/104.1, 100–102, 200

(56) References Cited

U.S. PATENT DOCUMENTS

| | | | |
|---|---|---|---|
| 4,600,919 A | | 7/1986 | Stern |
| 5,124,914 A | | 6/1992 | Grangeat |
| 5,163,126 A | | 11/1992 | Einkauf et al. |
| 5,731,819 A | | 3/1998 | Gagne et al. |
| 5,842,004 A | * | 11/1998 | Deering et al. ............. 345/501 |
| 6,057,859 A | | 5/2000 | Handelman et al. |
| 6,137,492 A | * | 10/2000 | Hoppe ........................ 345/420 |
| 6,184,897 B1 | * | 2/2001 | Gueziec et al. ............. 345/440 |
| 6,208,347 B1 | | 3/2001 | Migdal et al. |
| 6,285,378 B1 | * | 9/2001 | Duluk, Jr. ................... 345/441 |
| 6,337,880 B1 | | 1/2002 | Cornog et al. |
| 6,388,670 B2 | | 5/2002 | Naka et al. |
| 6,392,647 B1 | * | 5/2002 | Migdal et al. .............. 345/423 |
| 6,567,082 B1 | * | 5/2003 | Junkins et al. .............. 345/423 |
| 2002/0008698 A1 | * | 1/2002 | Pentkovski et al. |
| 2002/0050988 A1 | * | 5/2002 | Petrov et al. |

OTHER PUBLICATIONS

Alliez et al., "Progressive Compression for Lossless Transmission of Triangle Meshes." University of Southern California, Los Angeles, CA: 195–202, Aug. 2001.

Bajaj et al., "Progressive Compression and Transmission of Arbitrary Triangular Meshes." Department of Computer Sciences, University of Texas at Austin, Austin, TX, 1999.

Chow, "Optimized Geometry Compression for Real–time Rendering." Massachusetts Institute of Technology, Proceedings Visualization 1997, Oct. 19–24, 1997, Phoenix, AZ: 347–354.

Dyn, N., Levin, D., and Gregory, J.A. "A Butterfly Subdivision Scheme for Surface Interpolation with Tension Control." *ACM Transactions on Graphics*, vol. 9, No. 2 (1990).

Elber, "Line Art Rendering via a Coverage of Isoperimetric Curves." *IEEE Transactions on Visualization and Computer Graphics*, vol. 1, Department of Computer Science, Technion, Israel Institute of Technology, Haifa, Israel (Sep., 1995).

Foley et al., "Computer graphics: principal and practice." *Addison–Wesley Publishing Company*, Reading, MA, 1996: 1060–1064.

Hoppe, "Efficient Implementation of progressive meshes." *Coput. & Graphics*, vol. 22, No. 1: 27–36 (1998).

(List continued on next page.)

Primary Examiner—Greta Robinson
Assistant Examiner—Miranda Le
(74) Attorney, Agent, or Firm—Fish & Richardson P.C.

(57) ABSTRACT

A database includes a vertex array that contains coordinates of a three-dimensional mesh, a face array that contains pointers to target coordinates in the vertex array, the target coordinates defining a polygon in the three-dimensional mesh, a free vertex container that identifies elements in the vertex array that do not contain vertices, and a free face container that identifies elements in the face array that do not contain pointers.

25 Claims, 6 Drawing Sheets

OTHER PUBLICATIONS

Hoppe, "Progressive Meshes." *Microsoft Research*: 99–108. http://www.research.microsft.com/research/graphics/hoppe/, 1996.

Landsdown et al., "Expressive Rendering: A Review of Nanphotorealistic Techniques" *IEEE Computer graphics and Applicatons*: 29–37 (1995).

Lasseter, "Principles of Traditional Animation Applied to 3D Computer Animation" *Pixar*, San Rafael, California, 1987.

Lee, "Navigating through Triangle Meshes Implemented as Linear Quadtrees" Computer Science Department, Center for Automation Research, Institute for Advanced Computer Studies, University of Maryland College Park, MD, Apr., 1998.

Lewis, "Pose Space Deformation: A Unified Approach to Shape Interpolation and Skeleton–Driven Deformation." *Centropolis*, New Orleans, LA: 165–172, 2000.

Ma et al., "Extracting Feature Lines for 3D Unstructured Grids" Institute for Computer Applications in Science and Engineering (ICASE), NASA Langley Research Center, Hampton, VA, *IEEE* (1997).

Pajarola et al., Compressed Progressive Mesht38 Graphics, Visualization & Usability Center, College of Computing, Georgia Institute of Technology, Jan., 1999.

Raskar, "Image Precision Silhouette Edges" University of North Carolina at Chapel Hill, *Microsoft Research*, 1999 Symposium on Interactive 3D Graphics Atlanta, GA: 135–231 (1999).

Samet, "Applications of spatial data structures: computer graphics, image processing, and GIS." University of Maryland, *Addison–Wesley Publishing Company*, Reading, MA: 1060–1064 (Jun., 1990).

Thomas et al., "The Illusion of Life: Disney Animation," *Hyperion*, 3:47–71, New York, NY (1981).

Zeleznik et al., "SKETCH: An Interface for Sketching 3D Scenes." Brown University site of the NSF Science and Technology Center for Computer Graphics and Scientific Visualization (1996).

Zorin, D., Schroeder, P., and Sweldens, W. "Interpolating Subdivision for Meshes of Arbitrary Topology." Tech. Rep. CS–TB–96–06, Caltech, Department of Computer Science, (1996).

Hoppe "View–Dependent Refinement of Progressive Meshes" Microsoft Research (SIGGRAPH), 1997.

* cited by examiner

VERTEX ARRAY

| | |
|---|---|
| 0. X, Y, Z, U, V | |
| 1. X, Y, Z, U, V | |
| 2. empty | |
| 3. X, Y, Z, U, V, | |
| 4. empty | — 32 |
| 5. X, Y, Z, U, V | |
| 6. X, Y, Z, U, V | |
| 7. past highest | |
| ... | |
| ... | |

— 24

FREE VERTEX CONTAINER

| |
|---|
| 2 |
| 4 |
| |
| |

— 26

22

FACE ARRAY

| | |
|---|---|
| 0. 0, 1, 3 | |
| 1. 0, 0, 0 (empty) | |
| 2. 1, 3, 5 | — 34 |
| 3. 0, 0, 0 (empty) | |
| 4. 1, 0, 5 | |
| 5. past highest | |
| ... | |
| ... | |

— 28

FREE FACE CONTAINER

| |
|---|
| 1 |
| 3 |
| |
| |

DATABASE THAT STORES DATA FOR A THREE-DIMENSIONAL MESH

TECHNICAL FIELD

This invention relates generally to a database that stores data for a three-dimensional mesh and to a process for generating the database.

BACKGROUND

A 3D mesh (or "model") is made up of one or more polygons that define its outer surface or "skin". Removing polygons from the surface decreases the number of polygons in the 3D mesh and, thus, reduces the granularity of the surface.

DESCRIPTION OF THE DRAWINGS

FIG. 4 shows arrays in the database.

DETAILED DESCRIPTION

Figure 1:
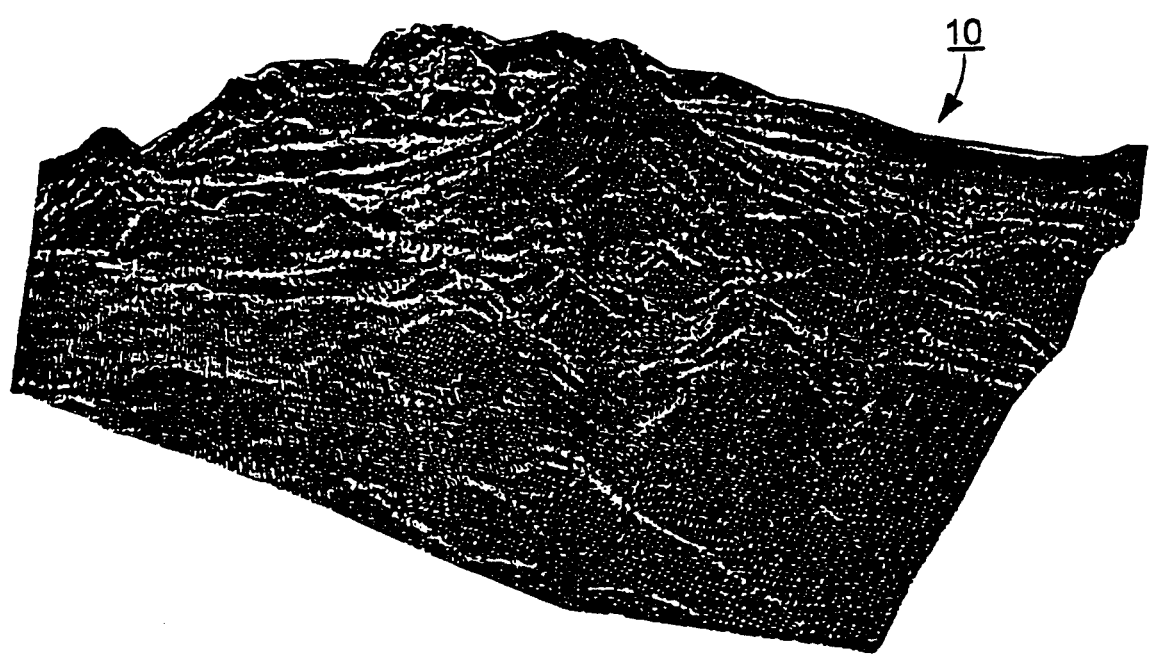
FIG. 1 is a perspective view of a 3D mesh.
Figure 2:
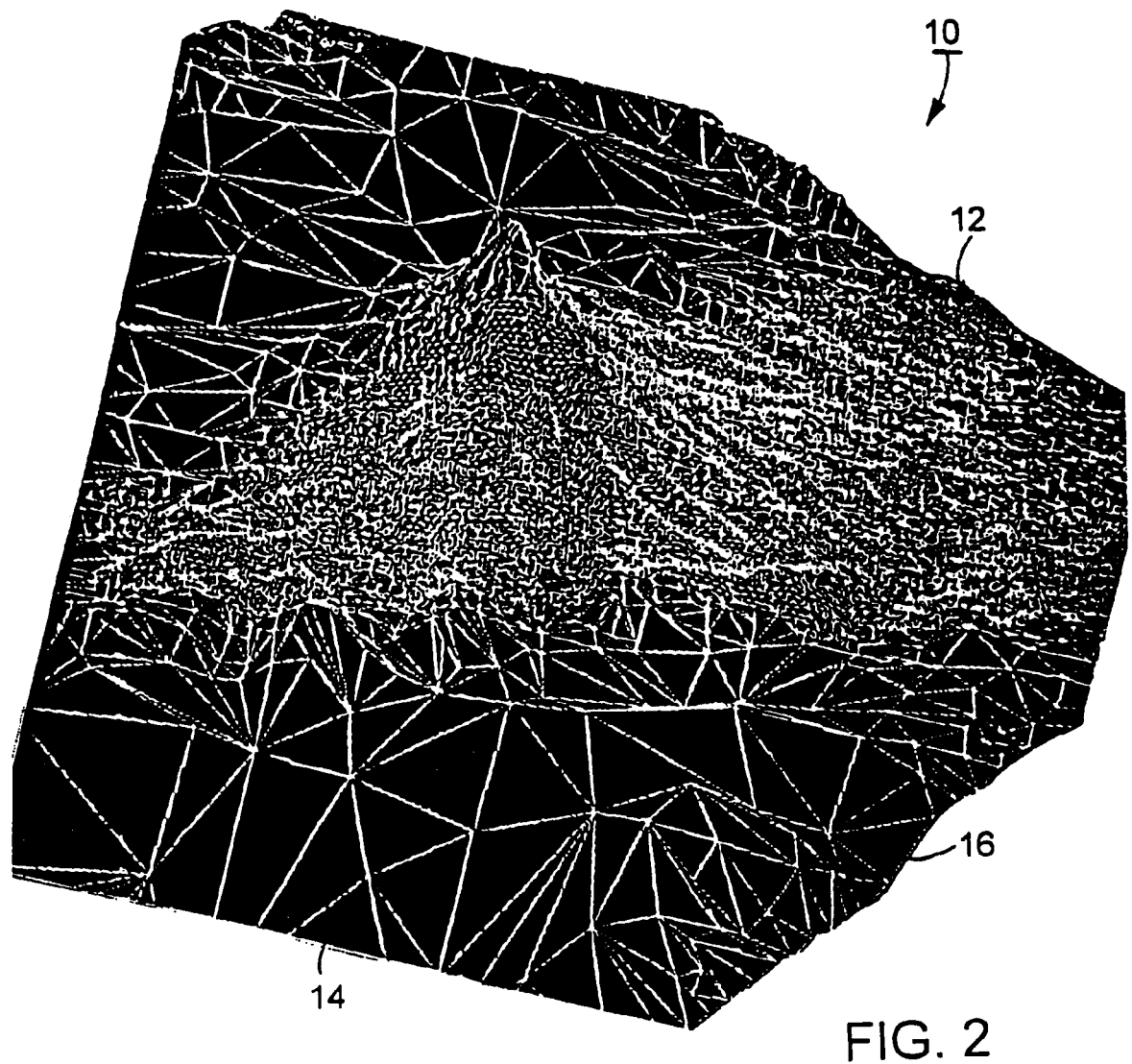
FIG. 2 is a perspective view of the 3D mesh after it has been adaptively simplified.

FIG. 1 shows a 3D mesh 10. FIG. 2 shows 3D mesh 10 after it has been subjected to adaptive simplification. In more detail, 3D mesh 10 (FIG. 2) is comprised of interconnecting polygons 16. Polygons 16 are triangles in this embodiment; however, other types of polygons may be used. The polygons are defined by two or more vertices. The vertices may be defined by Cartesian XYZ coordinates, for example.

Adaptive simplification is used to reduce detail in specific areas of a 3D mesh, while preserving detail in other areas of the 3D mesh. Detail is reduced by removing polygons from the initial surface (e.g., FIG. 1) of the 3D mesh. For example, portion 14 of 3D mesh 10 (FIG. 2) has had polygons removed, whereas portion 12 of 3D mesh 10 (for which greater detail is desired, such as peaks of a mountain), retains more polygons than portions 14. The portions of 3D mesh 10 that are to be simplified are determined by adaptive parameter(s) that identify which portions of 3D mesh 10 are to be simplified. The adaptive parameters may be stored in association with polygons for 3D mesh 10.

3D geometry is often viewed from the perspective of a virtual camera that moves through a 3D space occupied by a 3D landscape mesh, such as 3D mesh 10. Adaptive simplification is performed to reduce the number of polygons in 3D mesh 10 as those polygons are viewed by the virtual camera. For example, high levels of granularity of 3D mesh 10 may not be required while the virtual camera is in motion, which enables faster and more efficient 3D rendering. Thus, relatively large numbers of polygons may be removed during motion. When the virtual camera stops, slows down, revisits and/or focuses-in on an object in 3D mesh 10, a higher granularity may be desired, resulting in removal of fewer polygons from the initial surface (FIG. 1) stored in memory.

Other types of adaptive metrics may be used to perform adaptive simplification. For example, moving the virtual camera to a different portion of 3D mesh 10 can result in portions of the 3D mesh within a predetermined range of the camera retaining more polygons than other portions of the 3D mesh outside of the predetermined range.

Adaptively simplifying a 3D mesh in the manner described above involves deleting and/or adding polygons to 3D mesh 10. Heretofore, the polygons were stored in linked lists, in which vertices were stored separately for each polygon. This configuration did not allow polygons to share vertices, thus requiring large amounts of data to define a mesh. Moreover, graphics accelerator cards often have difficulty processing linked lists efficiently, making it difficult to change the granularity of the 3D mesh surface rapidly.

Accordingly, a process 20 (FIG. 3) generates (and updates) a database for storing polygons of an adaptive 3D mesh using arrays instead of linked lists. FIG. 4 shows the structure of a database 22 that is generated according to process 20. Database 22 includes a vertex array 24, a free vertex container 26, a face array 28, and a free face container 30. Free face container 30 and free vertex container 26 may be arrays or any other type of storage construct (e.g., hash tables).

Vertex array 24 is comprised of numbered elements 32. Each of these elements contains either coordinates of the 3D mesh (e.g., Cartesian XYZ coordinates) or an indication (e.g., "empty") that the element does not contain coordinates. Elements that do not contain coordinates are referred to herein as "holes" of the 3D mesh. In addition to coordinates, the elements of vertex array 24 may include additional information relating to the vertices defined by the coordinates. For example, vertex array 24 may include up to eight texture coordinates (e.g., $U_1V_1 \ldots U_8V_8$) for a vertex, color data/coordinates for the vertex, and/or any other information that defines the vertex with greater specificity.

Vertex array 24 does not store coordinates in numbered elements that are greater than a predetermined number. This keeps the size of vertex array 24 relatively manageable. Coordinates that are added to vertex array 24 are added to the "holes", i.e., the empty elements, as described below. As a result, the need for a large vertex array is reduced.

Free vertex container 26 identifies elements of vertex array 24 that do not contain coordinates, i.e., it identifies the holes. Free vertex container 26 stores pointers to such elements. In this embodiment, the pointers are the numbers of the elements containing holes (e.g., elements "2", "4" of free vertex container 26 correspond to "empty" elements "2", "4", respectively, in vertex array 24).

Face array 28 is also comprised of numbered elements 34. Each of these elements contains pointers to coordinates in vertex array 24 or an indication {"0, 0, 0 (empty)"} that the element does not contain pointers. As above, elements that do not contain pointers are referred to herein as "holes".

In this embodiment, the pointers are numbers that refer to coordinates stored in vertex array 24. For example, "element 0" of face array 28 contains pointers (0, 1, 3). Pointer "0" refers to the coordinates in element "0" of vertex array 24; pointer "1" refers to the coordinates in element "1" of vertex array 24; and pointer "3" refers to the coordinates in element "3" of vertex array 24. The three coordinates referred to by the pointers in face array 28 make up a polygon, in this case, a triangle, of adaptive 3D mesh 10.

By using face array 28 to reference coordinates in vertex array 24, vertices can be shared by more than one polygon (i.e., by different polygons referencing the same vertex). As a result, each vertex need only be stored once, reducing the amount of data required for an adaptive 3D mesh. Moreover, graphics accelerator cards can process arrays, such as those shown in FIG. 4, relatively efficiently.

As was the case with vertex array 24, face array 28 does not store pointers in numbered elements that are greater than a predetermined number. This keeps the size of face array 28 relatively manageable. Pointers that are added to face array 28 are added to the "holes", i.e., the empty elements, as described below. Thus, as was the case with vertex array 24, the need for a large face array is reduced.

The holes in face array 28 are stored in free face container 30. Free face container 30 identifies elements of face array 28 that do not contain pointers, i.e., it identifies the holes. Free face container 30 stores pointers to such elements. In this embodiment, the pointers are the numbers of the elements containing holes (e.g., elements "1", "3" of free face container 30 correspond to "empty" elements "1", "3", respectively, in face array 28).

Figure 3:
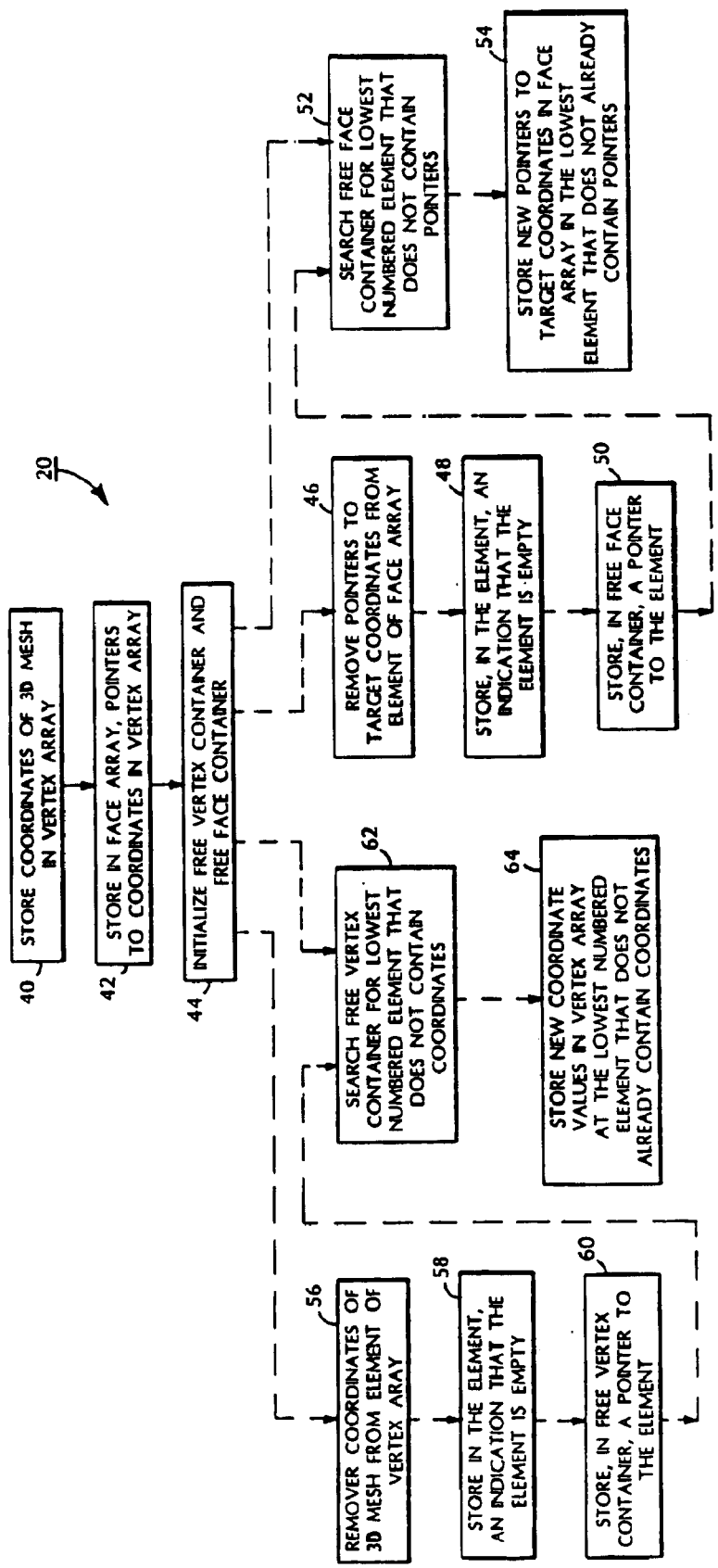
FIG. 3 is a flowchart of a process for generating a database that defines the 3D mesh.

FIG. 3 shows a process 20 for generating database 22. To generate database 22, process 20 stores (40) coordinates of 3D mesh 10 in elements of vertex array 24 (FIG. 4). As noted, these coordinates specify a point in 3D space (e.g., Cartesian XYZ coordinates) and may include additional information such as texture and/or color coordinates. Process 20 also stores (42), in face array 28, pointers to coordinates in vertex array 24. As noted above, the coordinates of vertex array 24 specified by the pointers in face array 28 define faces of polygons that make up 3D mesh 10. In both face array 28 and vertex array 24, any elements that do not contain coordinates or pointers include "empty" indications. Process 20 also initializes (44) free vertex container 26 and free face container 30, such that each element thereof is empty.

Once the database has been generated (40, 42, 44), the database may be updated. It is noted that vertex array 24 may be updated prior to generating face array 28 even though this is not specifically reflected in FIG. 3.

To remove a polygon from 3D mesh 10 (e.g., if the virtual camera changes position), process 20 removes (40) pointers to coordinates from an element of face array 28 that defines the polygon; stores (48), in that element, an indication that the element is empty; and stores (50), in free face container 30, a pointer to the element. The pointer in free face container 30 indicates that the element is empty. The pointer is stored at the first available element in free face container 30 from its top, meaning that the pointer is not necessarily appended to the end of free face container 30.

To add a polygon to 3D mesh 10 (e.g., if the virtual camera changes position), process 20 searches (52) free face container 30 for a lowest numbered element that does not contain pointers, i.e., for the lowest numbered element that contains a "hole". Process 20 stores (54) new pointers to target coordinates in that element. Thus, rather than simply appending new pointers to elements at the end of face array 28, process 20 stores the new pointers at empty elements, thereby holding-down the size of face array 28.

To remove coordinates from 3D mesh 10 (e.g., if the virtual camera changes position), process 20 removes (56) the coordinates from an element of vertex array 24; stores (58), in that element, an indication that the element is empty; and stores (60), in free vertex container 26, a pointer to the element. The pointer in free vertex container 26 indicates that the element is empty. The pointer is stored at the first available element in free vertex container 26 from its top, meaning that the pointer is not necessarily appended to the end of free vertex container 26.

If process 20 removes coordinates from vertex array 24 that are referenced by face array 28, a graphics accelerator card may encounter errors when trying to render the 3D mesh. Accordingly, if coordinates are removed that are also referenced in face array 28, the pointers in face array 28 that reference those coordinates should also be removed.

To add coordinates to 3D mesh 10 (e.g., if the virtual camera changes position), process 20 searches (62) free vertex container 26 for a lowest numbered element that does not contain coordinates, i.e., for the lowest numbered element that contains a "hole". Process 20 stores (64) new coordinates in that element. Thus, rather than simply appending new coordinates to elements at the end of vertex array 24, process 20 stores the new coordinates at empty elements, thereby holding-down the size of vertex array 24.

It is noted that adding/removing pointers and/or coordinates from face array 28 and vertex array 24, respectively, may be performed at any time. The order shown in FIG. 3 is merely an example of when adding/removing pointers and coordinates may occur.

Figure 5:
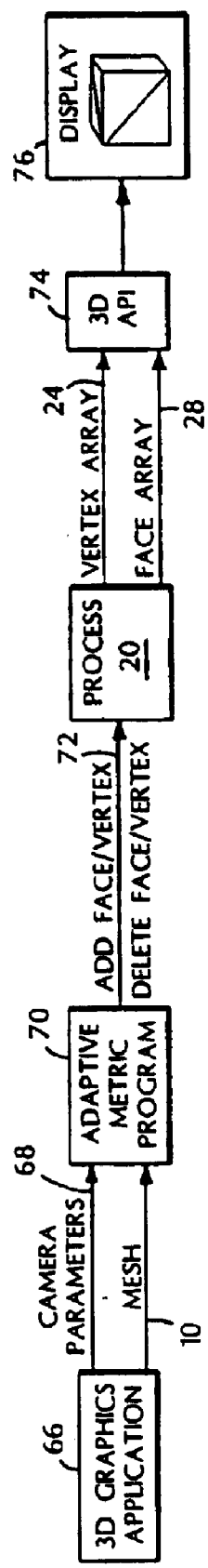
FIG. 5 is a block diagram of a graphics rendering process that uses the database.

FIG. 5 is a block diagram that shows how one embodiment of the invention operates. In the embodiment of FIG. 5, a 3D graphics application 66 provides virtual camera parameters 68 (e.g., coordinates of the location of the camera) and 3D mesh 10 to an adaptive metric program 70 that determines which polygons of the 3D mesh are to be added/removed based on the camera parameters. Data 72, which specifies the polygons of 3D mesh 10 that are to be added/removed from the 3D mesh, is provided to process 20, where the appropriate operations are performed with respect to database 22. Vertex array 24 and face array 28 are provided to a 3D API (Application Programming Interface 74), which generates a 3D model. The 3D model is displayed on display screen 76.

Figure 6:
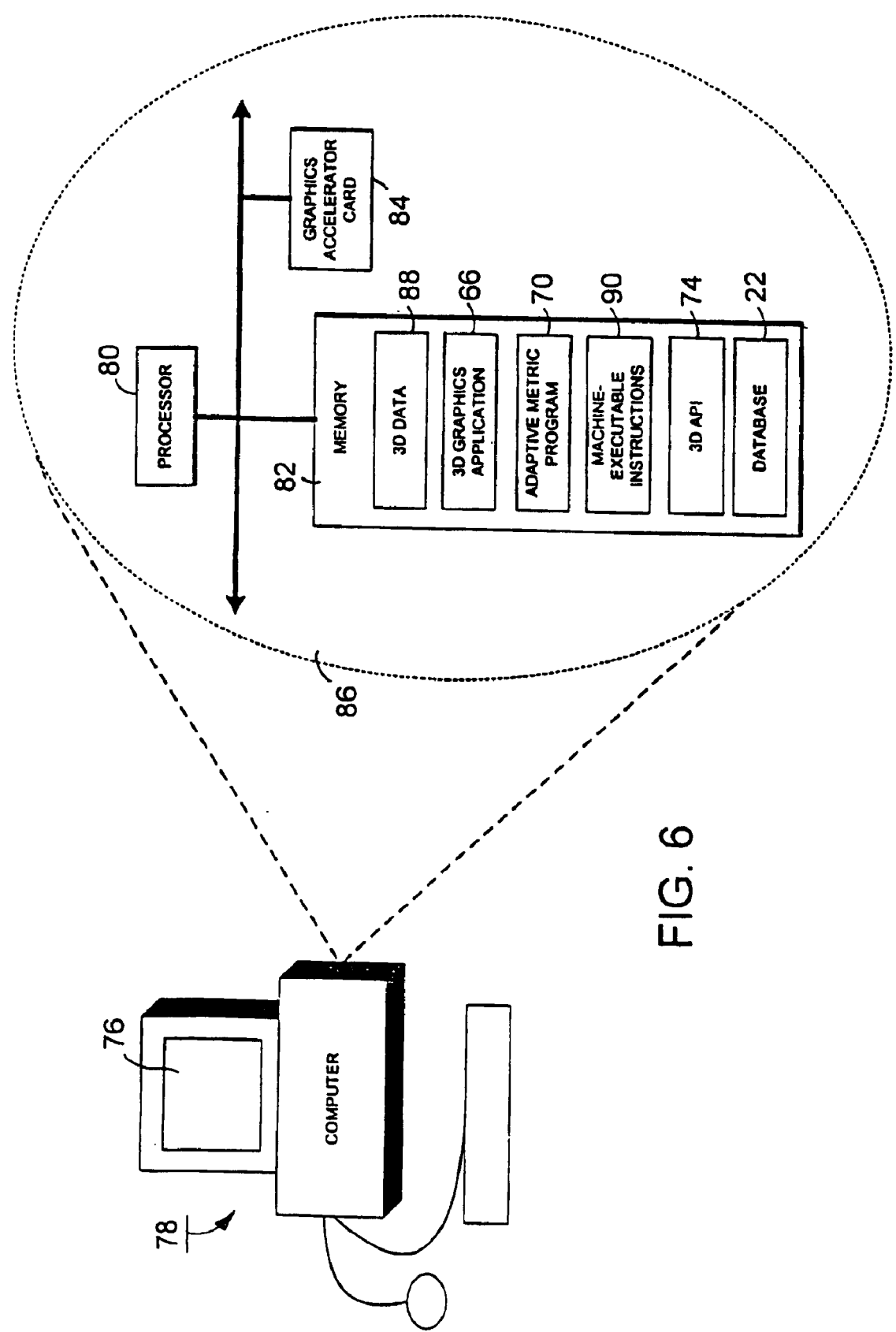
FIG. 6 is a perspective view of computer hardware that can be used to implement the process of FIG. 3.

FIG. 6 shows a computer 78 on which process 20 and the embodiment of FIG. 5 may be implemented. Computer 78 includes display screen 76, processor 80, memory 82 (e.g., a hard disk), and 3D graphics accelerator card 84 for processing 3D data (see view 86) in accordance with process 20 (with or without assistance from processor 80). Memory 82 stores 3D data 88 for 3D mesh 10, 3D graphics application 66, adaptive metric program 70, machine-executable instructions 90 for performing process 20, and 3D API 74. Memory 82 may also store database 22 or it may be stored on another memory (not shown), either internal, or external, to computer 78.

Process 20, however, is not limited to use with any particular hardware or software configuration; it may find applicability in any computing or processing environment. Process 20 may be implemented in hardware, software, or a combination of the two. Process 20 may be implemented in one or more computer programs executing on programmable computers that each include a processor, a storage medium readable by the processor (including volatile and non-volatile memory and/or storage elements), at least one input device, and one or more output devices. Program code may be applied to data entered using an input device to perform process 20 and to generate output information. The output information may be applied to one or more output devices.

Each such program may be implemented in a high level procedural or object-oriented programming language to communicate with a computer system. However, the programs can be implemented in assembly or machine language. The language may be a compiled or an interpreted language.

Each computer program may be stored on a storage medium, article or device (e.g., CD-ROM, hard disk, or magnetic diskette) that is readable by a general or special purpose programmable computer (or, more generally, machine) for configuring and operating the computer when the storage medium or device is read by the computer to perform process 20. Process 20 may also be implemented as a computer-readable storage medium, configured with a computer program, where, upon execution, instructions in the computer program cause the computer to operate in accordance with process 20.

Other embodiments not described herein are also within the scope of the following claims. For example, process 20 can be performed on any type of 3D mesh, not just 3D landscape meshes. Process 20 can be performed using adaptive simplification techniques other than those described above. The blocks of process 20 can be performed in a different order from that shown in FIG. 3.

What is claimed is:

1. A database stored on a machine-readable medium, the database comprising:
    a vertex array that contains coordinates of a three-dimensional mesh, the vertex array containing elements that are empty and that are interspersed among the coordinates, the elements being available for future storage of coordinates, the elements being numbered, each of the elements in the vertex array containing either a coordinate or an indication that the element is empty, wherein the vertex array does not store coordinates in elements that exceed a first predetermined number;
    a face array that contains pointers to target coordinates in the vertex array, the target coordinates defining a polygon in the three-dimensional mesh, the face array comprising numbered elements, each of the numbered elements in the face array containing either pointers or an indication that the element is empty, wherein the face array does not store pointers in elements that exceed a second predetermined number;
    a free vertex container that identifies elements in the vertex array that do not contain vertices; and
    a free face container that identifies elements in the face array that do not contain pointers.

2. The database of claim 1, wherein the free vertex container identifies elements in the vertex array using pointers.

3. The database of claim 1, wherein the free face container identifies elements in the face array using pointers.

4. The database of claim 1, wherein elements of the vertex array contain additional information relating to vertices in the vertex array.

5. The database of claim 4, wherein the additional information comprises a least one of texture coordinates and color information for vertices in the vertex array.

6. A method of generating a database that defines a three-dimensional mesh, comprising:
    storing coordinates of the three-dimensional mesh in a vertex array, wherein storing the coordinates comprises locating empty elements interspersed among coordinates already stored in the vertex array, and storing the coordinates in an empty element that has a lowest number, wherein elements of the vertex array are numbered, each of the elements in the vertex array containing either a coordinate or an indication that the element is empty, and wherein the vertex array does not store coordinates in elements that exceed a first predetermined number;
    storing, in a face array, pointers to target coordinates in the vertex array, the target coordinates defining a polygon in the three-dimensional mesh, wherein the face array comprises numbered elements, each of the numbered elements in the face array containing either pointers or an indication that the element is empty, and wherein the face array does not store pointers in elements that exceed a second predetermined number;
    storing, in a free vertex container, data that identifies elements in the vertex array that do not contain coordinates; and
    storing in a free face container, data that identifies elements in the face array that do not contain pointers.

7. The method of claim 6, further comprising:
    removing coordinates of the three-dimensional mesh from an element of the vertex array;
    storing, in the element, an indication that the element is empty; and
    storing, in the free vertex container, a pointer to the element.

8. The method of claim 7, wherein the pointer comprises a number of the element.

9. The method of claim 8, further comprising:
    searching the free vertex container for a lowest numbered element that does not contain coordinates; and
    storing new coordinate values in the vertex array at the lowest numbered element specified in the free vertex container.

10. The method of claim 6, further comprising:
    removing pointers to target coordinates from art element of the face array;
    storing, in the element, an indication that the element is empty; and
    storing, in the free face container, a pointer to the element.

11. The method of claim 10, wherein the pointer comprises a number of the element.

12. The method of claim 11, further comprising:
    searching the free face container for a lowest numbered element that does not contain pointers; and
    storing new pointers to target coordinates in the face array at the lowest numbered element specified in the free face container.

13. An article comprising a machine-readable medium that stores instructions for generating a database that defines a three-dimensional mesh, the instructions causing a machine to:
    store coordinates of the three-dimensional mesh in a vertex array, wherein storing the coordinates comprises locating empty elements interspersed among coordinates already stored in the vertex array, and storing the coordinates in an empty element that has a lowest number, wherein elements of the vertex array are numbered, each of the elements in the vertex array containing either a coordinate or an indication that the element is empty, and wherein the vertex array does not store coordinates in elements that exceed a first predetermined number;
    store, in a face array, pointers to target coordinates in the vertex array, the target coordinates defining a polygon in the three-dimensional mesh, wherein the face array comprises numbered elements, each of the numbered elements in the face array containing either pointers or an indication that the element is empty, and wherein the face array does not store pointers in elements that exceed a second predetermined number;
    store, in a free vertex container, data that identifies elements in the vertex array that do not contain coordinates; and store, in a free face container, data that identifies elements in the face array that do not contain pointers.

14. The article of claim 13, further comprising instructions that cause the machine to:

remove coordinates of the three-dimensional mesh from an element of the vertex array;

store, in the element, an indication that the element is empty; and store, in the free vertex container; a pointer to the element.

15. The article of claim 14, wherein the pointer comprises at number of the element.

16. The article of claim 15, further comprising instructions that cause the machine to:

search the free vertex container for a lowest numbered element that does not contain coordinates; and store new coordinate values in the vertex array at the lowest numbered element specified in the free vertex container.

17. The article of claim 13, further comprising instructions that cause the machine to:

remove pointers to target coordinates from an element of the face array;

store, in the element, an indication that the element is empty; and store, in the free face container, a pointer to the element.

18. The article of claim 17, wherein the pointer comprises a number of the element.

19. The article of claim 18, further comprising instructions that cause the machine to:

search the free face container for a lowest numbered element that does not contain pointers; and store new pointers to target coordinates in the face array at the lowest numbered element specified in the free face container.

20. An apparatus for generating a database that defines a three-dimensional mesh, comprising:

a memory that stores executable instructions; and a processor that executes the instructions to:

store coordinates of the three-dimensional mesh in a vertex array, wherein storing the coordinates comprises locating empty elements interspersed among coordinates already stored in the vertex array, and storing the coordinates in an empty element that has a lowest number, wherein elements of the vertex array are numbered elements, each of the elements in the vertex array containing either a coordinate or an indication that the element is empty, and wherein the vertex array does not store coordinates in elements that exceed a first predetermined number;

store, in a face array, pointers to target coordinates in the vertex array, the target coordinates defining a polygon in the three-dimensional mesh, wherein the face array comprises numbered elements, each of the numbered elements in the face array containing either pointers or an indication that the element is empty, and wherein the face array does riot store pointers in elements that exceed a second predetermined number;

store, in a free vertex container, data that identifies elements in the vertex array that do not contain coordinates; and store, in a free face container, data that identities elements in the face array that do not contain pointers.

21. The apparatus of claim 20, wherein the processor executes instructions to:

remove coordinates of the three-dimensional mesh from an element of the vertex array;

store, in the element, an indication that the element is empty; and store, in the free vertex container, a pointer to the element.

22. The apparatus of claim 21, wherein the pointer comprises a number of the element.

23. The apparatus of claim 22, wherein the processor executes instructions to:

search the free vertex container for a lowest numbered element that does not contain coordinates; and store new coordinate values in the vertex array at the lowest numbered element specified in the free vertex container.

24. The apparatus of claim 20, wherein the processor executes instructions to:

remove pointers to target coordinates from an element of the face array;

store, in the element, an indication that the element is empty; and store, in the free face container, a pointer to the element.

25. The apparatus of claim 24, wherein the element is numbered, the painter comprises a number of the element, and the processor executes instructions to:

search the free face container for a lowest numbered element that does not contain pointers; and store new pointers to target coordinates in the face array at the lowest numbered element specified in the free face container.

* * * * *